United States Patent [19]

Nishimura

[11] Patent Number: 4,613,022
[45] Date of Patent: Sep. 23, 1986

[54] TORQUE CONVERTER ONE WAY LOCK-UP CLUTCH

[75] Inventor: Sadanori Nishimura, Ohmiya, Japan

[73] Assignee: Honda Giken Kogyo Kabushiki Kaisha, Tokyo, Japan

[21] Appl. No.: 444,879

[22] Filed: Nov. 29, 1982

[30] Foreign Application Priority Data

Nov. 28, 1981 [JP] Japan .................. 56-189910

[51] Int. Cl.$^4$ ............................. F16D 39/00
[52] U.S. Cl. .................... 192/3.29
[58] Field of Search .............. 192/3.28, 3.29, 3.3, 192/3.31, 3.33, 0.076, 0.075, 0.07, 65, 103 R; 74/731, 732, 733

[56] References Cited

U.S. PATENT DOCUMENTS

| 2,723,735 | 11/1955 | Banker | 192/3.31 |
| 2,824,631 | 2/1958 | De Lorean | 192/3.31 |
| 4,173,270 | 11/1979 | Croswhite et al. | 192/3.29 |
| 4,294,140 | 10/1981 | Iwanaga et al. | 192/3.31 |
| 4,457,411 | 7/1984 | Hiramatsu | 192/3.31 |
| 4,457,413 | 7/1984 | Hattori | 192/3.31 |
| 4,462,490 | 7/1984 | Hattori | 192/3.31 |

FOREIGN PATENT DOCUMENTS

| 391837 | 5/1933 | United Kingdom . |
| 630961 | 10/1949 | United Kingdom . |
| 1413430 | 11/1975 | United Kingdom . |
| 2033028A | 5/1980 | United Kingdom . |
| 1574669 | 9/1980 | United Kingdom . |
| 2069632A | 8/1981 | United Kingdom . |

*Primary Examiner*—George H. Krizmanich
*Attorney, Agent, or Firm*—Armstrong, Nikaido, Marmelstein & Kubovcik

[57] ABSTRACT

A fluid torque converter for a vehicle is provided which comprises a pump wheel connected to an engine output shaft via a drive plate, a turbine wheel connected to a turbine shaft and a one-way, on-off clutch arranged in the space between the drive plate and the turbine wheel. The clutch effects the mechanical transmission of power from the engine output shaft to the turbine shaft. The one-way clutch has an annular driving clutch member with a conical surface connected to the drive plate via an inner plate, and an annular driven clutch member with a conical surface is connected to the turbine wheel via a piston and a spring. A plurality of wedge rollers are disposed and held between the conical surfaces of the driving and driven clutch members.

5 Claims, 5 Drawing Figures

TORQUE CONVERTER ONE WAY LOCK-UP CLUTCH

BACKGROUND OF THE INVENTION

1. Field of the Invention

The present invention relates to a fluid torque converter for vehicles such as automobiles, which have a built-in on-off type clutch for connecting and disconnecting a pump wheel and a turbine wheel and effecting the mechanical transmission of power from an engine output shaft to a turbine shaft.

2. Description of the Prior Art

A fluid torque converter has been proposed wherein the torque converter comprised a drive plate connected to an engine output shaft, a pump wheel connected to the drive plate, a turbine wheel connected to a turbine shaft provided between the drive plate and the pump wheel, and a one-way, on-off clutch for the mechanical transmission of power from the engine output shaft to the turbine shaft (U.S. patent application Ser. No. 318,985, filed Nov. 6, 1981). Generally, a friction clutch has been used as the direct-coupling clutch for a fluid torque converter. There are, however, advantages when a one-way clutch is used for the direct coupling clutch instead of the friction clutch. That is, when a vehicle is decelerated suddenly, slippage of the one-way clutch occurs and the mechanical transmission of a reverse load from the turbine shaft to the engine shaft via the one-way clutch is automatically cut-off and is shifted to a fluid transmission operation, thus absorbing the reverse load to alleviate the shock which occurs during the sudden deceleration and to achieve better fuel consumption of the vehicle by preventing the engine from an over-revolution which occurs with the mechanical transmission of the reverse load. However, there are some disadvantages in the above-described fluid torque converter which has the one-way clutch built in an inner core of the torque converter defined by and between the pump wheel and the turbine wheels. Specifically, difficulty is encountered in providing the one-way clutch in a fluid torque converter having an oval or elliptical shape in the cross-section of the wheels thereof since the fluid torque converter has a smaller inner core area than a conventional fluid torque converter. Further, a complicated structure in the fluid torque converter is required for an oil passage connected to the one-way clutch since the oil passage must pass through the pump or turbine wheel. Still further, there is little space for designing the one-way clutch since the one-way clutch is provided in the inner core and, therefore, the diameter and the capacity for transmission of power are limited in size and an arrangement of the inner core of the fluid torque converter.

SUMMARY OF THE INVENTION

Therefore, it is an object of the present invention to provide a fluid torque converter wherein a one-way, on-off clutch is included, even if the fluid torque converter has an oval or elliptical shape in cross-section of the wheels thereof.

It is another object of the present invention to provide a fluid torque converter in which an oil passage to be connected to the one-way clutch is improved to facilitate the assembling by eliminating the need for the oil passage to pass through the wheels thereof.

It is a further object of the present invention to provide a fluid torque converter which may have different types of one-way clutches built in, for example, a length of a diameter and a capacity of transmission of power, thus enabling the extension of the area of designing of the fluid torque converter.

According to the present invention, in a fluid torque converter with a built-in, one-way, on-off clutch, the mechanical transmission of power is provided from an engine output shaft to a turbine shaft. The torque converter comprises a drive plate connected to the engine output shaft, a pump wheel connected to the drive plate and a turbine wheel connected to the turbine shaft, which is provided between the drive plate and the pump wheel. The one-way clutch is provided in a space defined by and between the drive plate and the turbine wheel.

DETAILED DESCRIPTION OF THE PREFERRED EMBODIMENT

Figure 1:
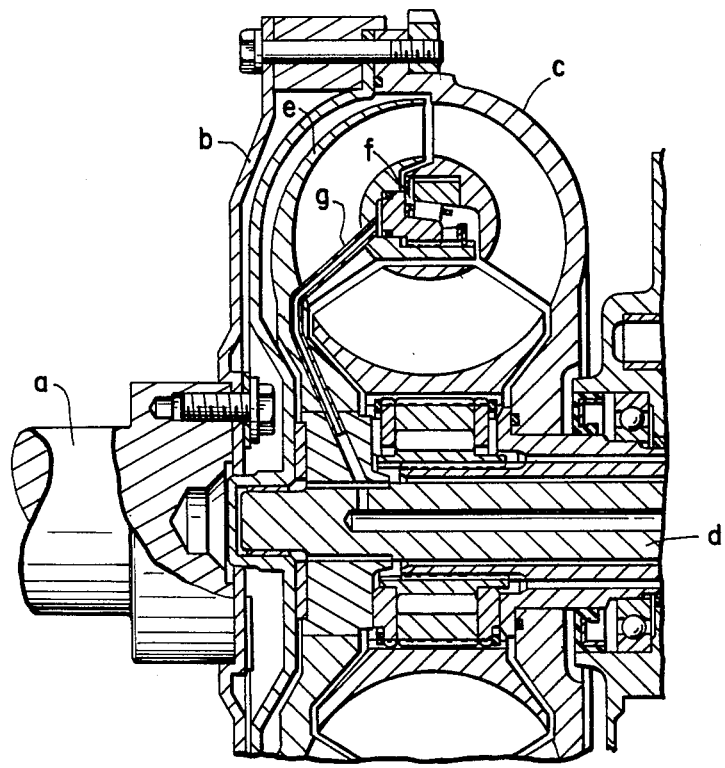
FIG. 1 is a longitudinal sectional view of a prior art torque converter.

FIG. 1 shows a typical prior art torque converter in which clutch f is located in the core between pump wheel c and turbine wheel e, and the fluid passage g for carrying fluid to the clutch passages through the turbine wheel 3.

Figure 2A:
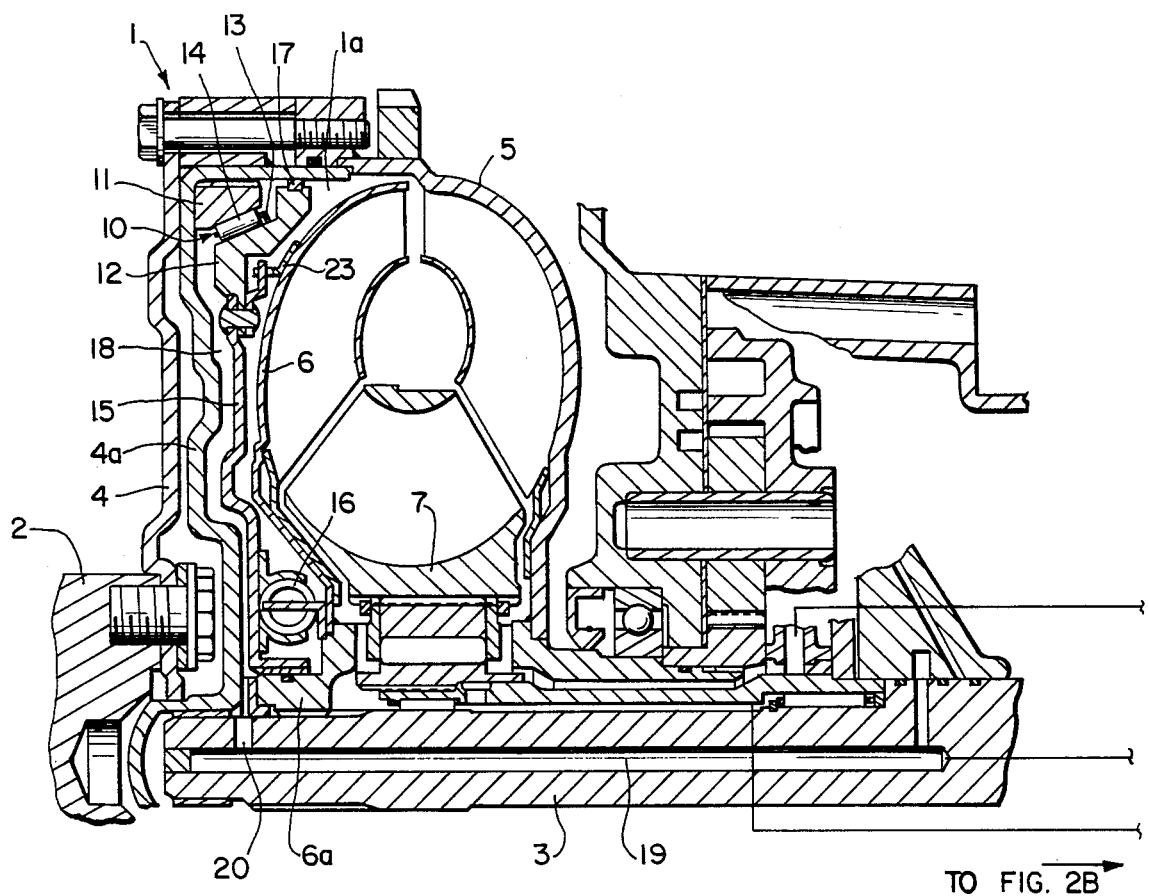
FIG. 2A is a longitudinal sectional view of a first embodiment of a torque converter of the present invention.
Figure 2B:
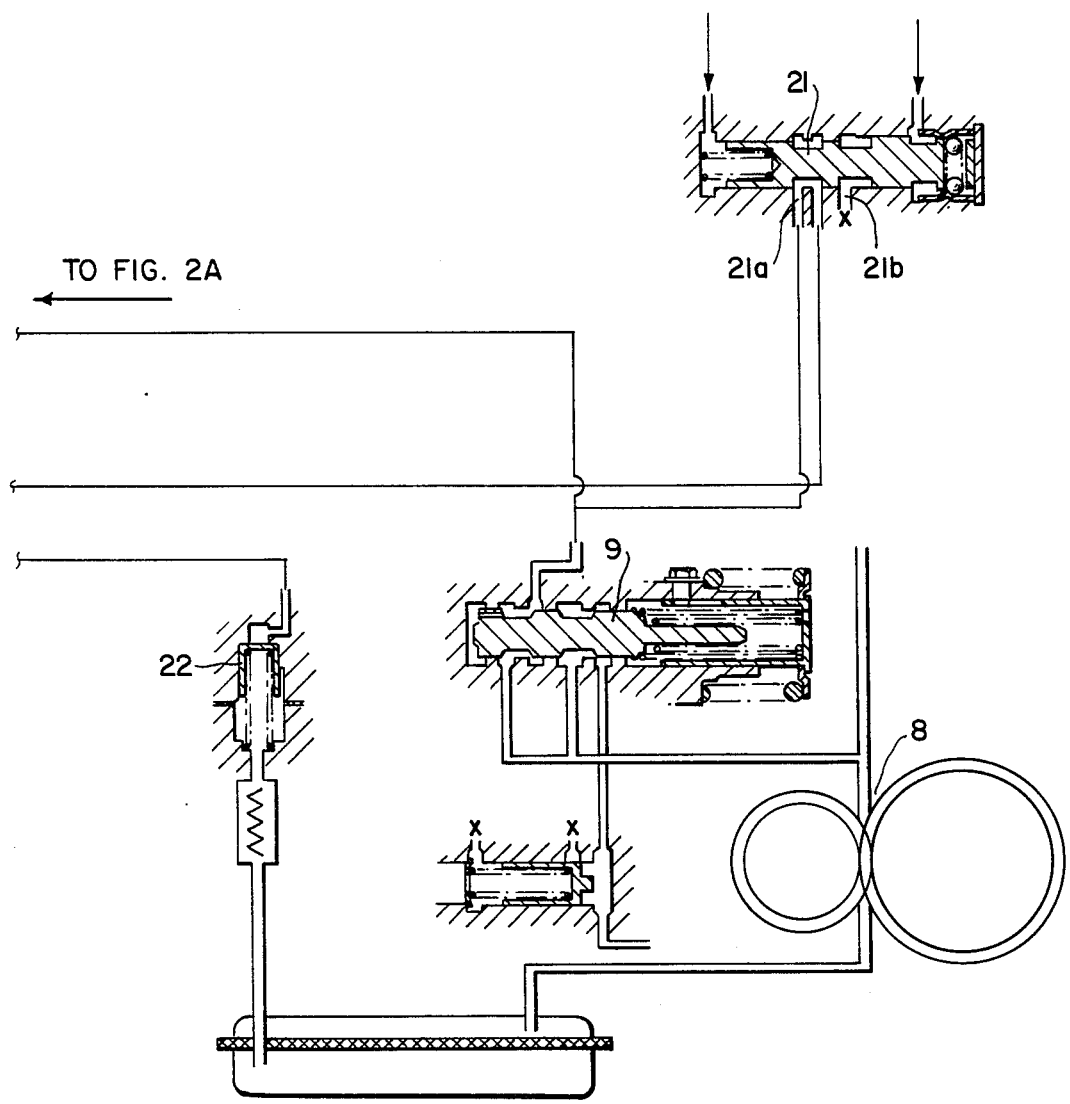
FIG. 2B is an extended portion of FIG. 2A.

Referring to FIG. 2, a fluid torque converter 1 has an engine output shaft 2 connected to an engine and a turbine shaft output 3 connected to drive wheels. Both the engine output and the turbine shafts 2 and 3 are provided on the same axis.

The fluid torque converter 1 also has a pump wheel 5 connected to the engine output shaft 2 via a drive plate 4. A turbine wheel 6 is connected to the turbine shaft 3 via a boss 6a, which is provided between the drive plate 4 and the pump wheel 5 and a stator wheel 7 is provided between the pump wheel 5 and the turbine wheel 6. Pressurized oil from a pump 8 is supplied via a regulator 9 into the space 1a of the fluid torque converter 1. The space 1a is defined by the drive plate 4 and the turbine wheel 6. The fluid transmission of power from the engine output shaft 2 to the turbine shaft is carried out by the circulation of fluid through the pump 5, turbine 6 and stator wheel 7. A one-way, on-off clutch is adapted to permit the mechanical transmission of power from the engine output shaft 2 to the turbine shaft 3 at a time of mechanical contact thereof. The one-way clutch 10 comprises an annular driving clutch member 11 having a conical driving surface at the inner periphery thereof and an annular driven clutch member 12 having a conical driven surface at the outer periphery thereof, which is opposed and parallel to the conical driving surface. A plurality of cylindrical wedge rollers 14 are disposed between the conical driving and driven surfaces.

Figure 3:
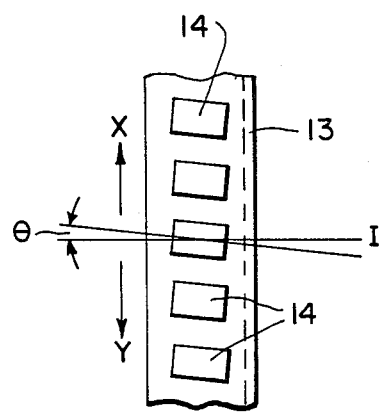
FIG. 3 is a plan view of a roller retainer and wedge rollers of the present invention.

Referring to FIG. 3, the wedge rollers 14 are held in an annular roller retainer 13 in such a manner that the central axis of each of the wedge rollers 14 is inclined at a predetermined angle $\theta$ with respect to a generatrix I having a vertical angle equal to that of the conical driving and driven surfaces. The annular driven clutch member 12 is slidable in the axial direction and is adapted to be moved by movement of a piston 15 to contact and disengage the annular driving clutch member 11. When the annular driving and driven clutch members 11 and 12 are in an engaged state, the driving clutch member 11 is rotated with respect to the driven clutch member 12 in the X-direction in FIG. 3 and the wedge rollers 14 are also rolled by a rotary force of the driving clutch members 11 and then come into engagement with both of the conical driving and driven surfaces to cause the annular driving and driven clutch members 11,12 to be coupled together mechanically. Therefore, the mechanical transmission of power from the engine output shaft 2 to the turbine shaft 3 is effected by the mechanical contact of the annular driving and driven clutch members 11 and 12. When the rotational speed of the driven clutch member 12 becomes higher than that of the driving clutch member 11, the driving clutch member 11 is then rotated with respect to the driven clutch member 12 in the Y-direction in FIG. 3. The wedge rollers 14 are, therefore, disengaged from the conical driving and driven surfaces to put the driving and driven clutch members 11 and 12 in a disengaged stage. Accordingly, the mechanical transmission of power from the turbine shaft 3 to the engine output shaft 2 is cut off. The above-mentioned explanation of the fluid torque converter is substantially identical with the prior art.

According to the present invention, however, the one-way clutch 10 is provided in a space difined by and between the drive plate 4 and the turbine wheel 6. Further, the one-way clutch 10 may be used in a fluid torque converter having an oval or elliptical shape in the wheel cross-section thereof. Furthermore, in the present invention, an oil passage is connected to a piston 15 without providing an oil passage in the pump and turbine wheels 5 and 6.

The annular driving clutch member 11 is provided in the space defined by and between the drive plate 4 and the turbine wheel 6 and is also spline-connected to the inner circumferential wall of an inner plate 4a fixed to the drive plate 4. The annular piston 15 is rotatable about the boss 6a and is axially slidable and is provided on the boss 6a attached to the inner periphery of the turbine wheel 6. The piston 15 is also connected to the turbine wheel 6 via a reaction spring 16. The annular driven clutch member 12 is fastened by rivets to the outer periphery of the piston 15 and is slidably fitted in the inner plate 4a via an annular oil seal 17 provided at a flange of outer periphery of the driven clutch member 12. An oil chamber 18 is formed between the inner plate 4a and the piston 15 and is sealed from the space 1a of the fluid torque converter 1 by the oil seal 17.

When the pressurized oil is discharged from the oil chamber 18, the pressure in the oil chamber becomes lower than that of the space 1a. Therefore, the differences of oil-pressure force on this piston 15 move the piston forward (left-hand direction in FIG. 2) to bring the wedge rollers 14 into contact with the conical surfaces of both of the annular driving and driven clutch members 11 and 12.

When the pressurized oil is supplied to the oil chamber to compensate for the differences in oil-pressure of the oil chamber 18 and the space 1a, the wedge rollers 14 are disengaged from the conical surfaces thereof.

Then the driving and driven clutch members 11 and 12 are placed in a freely rotatable disengaged state.

Further, in the present invention, the oil passage which is connected to the oil chamber 18, for example, is formed by forming a radially extending oil passage 20 within the turbine shaft 3 and, therefore, there is no need to provide an oil passage in the turbine wheel 6. A hydraulic control valve 21, connected to an axially extending oil passage 19, is adapted to be shifted to an oil-supplying position and an oil-discharging position in accordance with the balance of the throttle pressure representing the throttle opening of the engine and the governor pressure representing the rotational speed of the load, for example, the vehicle speed. When the hydraulic control valve 21 is in the supplying position, the oil passage 19 communicates with an oil supplying port 21a shown in FIG. 2. When the control valve 21 is in the oil-discharging position (left-hand direction in FIG. 2), the oil passage 19 is shifted to communicate with an oil-discharging port 21b. A check valve 22 is connected in an oil-discharging passage connected to the space 1a. A stopper 23, which is interposed between the turbine wheel 6 and the driven clutch member 12 actuates to prevent the spring 16 from over-expansion and contraction.

When the hydraulic control valve 21 is in the supplying position, the pressurized oil is supplied to the oil chamber 18 so that the on-way clutch 10 is placed in a cut-off state. Consequently, mechanical transmission of power from the engine output shaft 2 to the turbine shaft 3 is automatically cut off and shifted to a fluid transmission operation. When the control valve 21 is turned to a discharging position, the pressurized oil is discharged from the oil chamber so that the one-way clutch 10 is placed in a coupled state. Therefore, the mechanical transmission of power from the engine output shaft 2 to the turbine shaft 3 is effected via the drive plate 4, the one-way clutch 10, the reaction spring 16 and the turbine wheel 6.

When the vehicle is decelerated suddenly, the rotational speed of the turbine shaft 3 becomes higher than that of the engine output shaft 2. As a consequence, the mechanical transmission of power from the turbine shaft 3 to the engine output shaft 2 via the one-way clutch 10 is cut off and automatically shifted to a fluid transmission operation.

Figure 4:
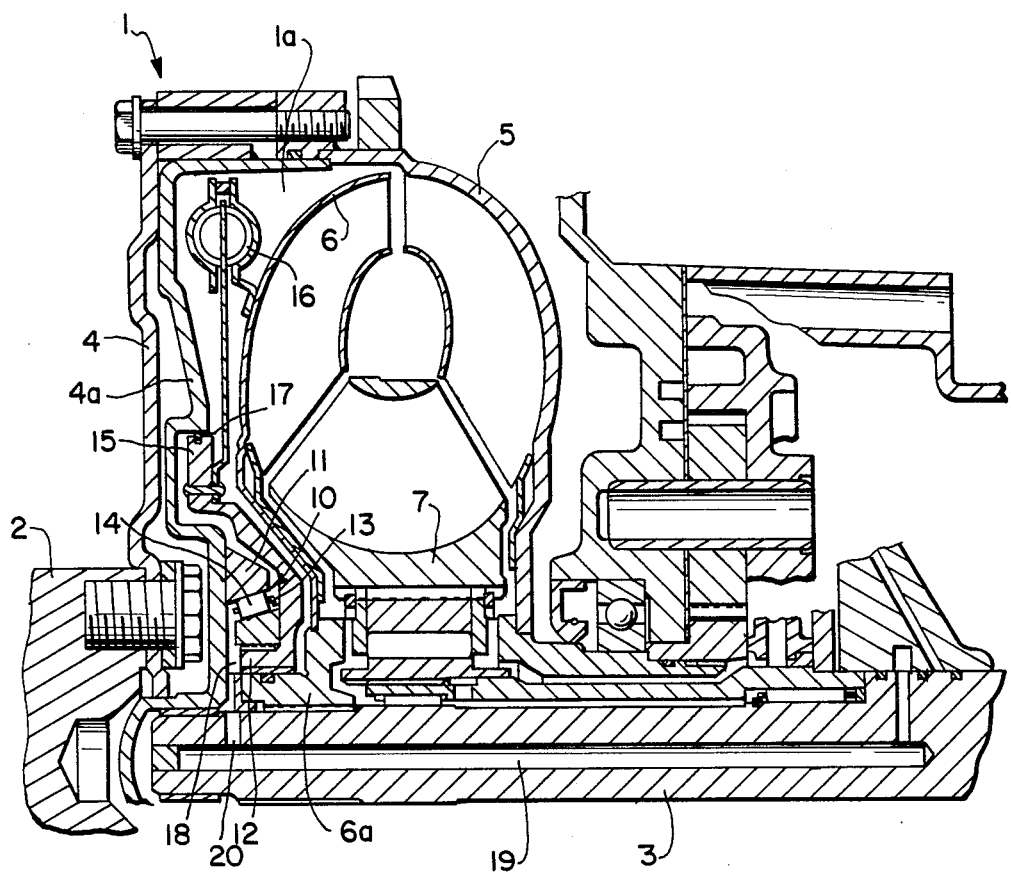
FIG. 4 is a longitudinal sectional view of another embodiment of a torque converter of the present invention.

In the embodiment described above, the fluid torque converter uses a one-way clutch 10 of substantially the same inside diameter as the drive plate and, therefore, has a large capacity for transmission of power. It will also be apparent, in accordance with the present invention, that the different types of the one-way clutches may be provided in the fluid torque converter, i.e., a one-way clutch having a relatively small diameter may be positioned in a space such as an inner peripheral portion of the space 1a as shown in FIG. 4. Furthermore, the large spring 16 having a relatively long length may be provided in the remaining space, such as the outer portion of the space 1a because of its larger dimensions than that of the inner space. This improves the absorbability of fluctuations of engine torque during mechanical transmission of power. Moreover, with use of piston 15 having a small diameter, the oil chamber may be sealed by an oil seal 17 having a smaller diameter than that of the oil seal 17 of FIG. 2. In this manner, reliability and durability of the oil seal 17 is significantly improved.

Although the invention has been described in its preferred form with a certain degree of particularity, it is construed that the present disclosure of the preferred form may be changed in the details of the combination and arrangement of the parts without departing from the spirit and scope if the invention as hereinafter claimed.

What is claimed is:

1. A fluid torque converter comprising; a drive plate connected to a driving power source an inner plate fixed to the drive plate, a pump wheel connected to the drive plate, a turbine shaft, a turbine wheel connected to the turbine shaft and positioned between the drive plate and the pump wheel, a one-way clutch positioned in a space defined by the drive plate and the turbine wheel and adapted to mechanically connect the drive plate and the turbine wheel, wherein the one-way clutch comprises a driving clutch member having a conical surface connected to the drive plate, a driven clutch member having a conical surface connected to the turbine wheel, a wedge roller means positioned between the conical surfaces of the driving and driven clutch members, and means for moving the driving and driven clutch members relative to each other to mechanically connect the driving and driven clutch members via the wedge roller means, said means for moving the driving and driven clutch members relative to each other comprises an annular piston rotatably and axially slidable about the turbine shaft and fixed to the driven clutch member, a spring means provided between the annular piston and the turbine wheel and a hydraulic chamber formed in the space between the inner plate and the annular piston.

2. a fluid torque converter according to claim 1 wherein the wedge roller means is positioned such that, when the one-way clutch is in a disengaged state, the central axis of each of the rollers is inclined with respect to a generatrix having a vertical angle equal to the angle of the conical surfaces of the driving and driven clutch members.

3. A fluid torque converter according to claim 1 wherein the driving clutch member is positioned adjacent the inner portion of the drive plate.

4. A fluid torque converter according to claim 1 including a fluid passage extending from the turbine shaft directly into the hydraulic chamber.

5. A fluid torque converter according to claim 1, wherein one of the driving clutch member and spring means is positional adjacent the inner portion of the drive plate and the other is positioned adjacent the outer portion of the drive plate.

* * * * *